US008327446B2

(12) United States Patent
Liang et al.

(10) Patent No.: US 8,327,446 B2
(45) Date of Patent: Dec. 4, 2012

(54) ANTIVIRUS STAND-ALONE NETWORK OR INTERNET APPLIANCE AND METHODS THEREFOR

(75) Inventors: Jeremy Liang, San Jose, CA (US); Jin-Shi Lee, Junghe (TW); Tsung-Lin Yu, Ilan (TW)

(73) Assignee: Trend Micro Inc., Tokyo (JP)

( * ) Notice: Subject to any disclaimer, the term of this patent is extended or adjusted under 35 U.S.C. 154(b) by 2418 days.

(21) Appl. No.: 10/138,478

(22) Filed: May 6, 2002

(65) Prior Publication Data

US 2003/0208687 A1 Nov. 6, 2003

(51) Int. Cl.
*G06F 11/00* (2006.01)
(52) U.S. Cl. ............. 726/24; 726/25; 713/188; 717/170
(58) Field of Classification Search .................. 713/1, 2, 713/188, 194; 380/200, 201, 255, 277; 726/2, 726/22–25; 717/170
See application file for complete search history.

(56) References Cited

U.S. PATENT DOCUMENTS

| | | | | |
|---|---|---|---|---|
| 5,051,982 A | * | 9/1991 | Brown et al. | 370/381 |
| 5,509,065 A | * | 4/1996 | Fitzgerald | 379/279 |
| 5,583,986 A | * | 12/1996 | Park et al. | 714/10 |
| 5,961,642 A | * | 10/1999 | Lewis | 713/1 |
| 6,272,522 B1 | * | 8/2001 | Lin et al. | 709/200 |
| 6,378,068 B1 | * | 4/2002 | Foster et al. | 713/1 |
| 6,457,175 B1 | * | 9/2002 | Lerche | 717/173 |
| 6,665,673 B1 | * | 12/2003 | Petersen et al. | 707/10 |
| 6,996,829 B2 | * | 2/2006 | Meyer | 719/328 |
| 2002/0049862 A1 | * | 4/2002 | Gladney et al. | 709/250 |
| 2004/0204087 A1 | * | 10/2004 | Carlsson | 455/558 |

* cited by examiner

*Primary Examiner* — Zachary A Davis
*Assistant Examiner* — Joseph Pan
(74) *Attorney, Agent, or Firm* — Beyer Law Group LLP (57) ABSTRACT

The invention provides an antivirus network or Internet appliance and methods therefor. A preferred embodiment of the Internet appliance according to the invention comprises an interface connecting the Internet appliance to a terminal, a memory, and a network connection connecting the Internet appliance to a network (such as a wide area network (WAN) or the Internet) wherein data in the network are operable with a corresponding network protocol (such as TCP/IP). Protocol-level programs are stored in the memory for receiving data being transmitted from the network to the terminal through the Internet appliance wherein the protocol-level programs are compatibly operable with the network protocol. Application-level antivirus programs are stored in the memory for detecting computer viruses in the received data serving as a firewall against the detected computer viruses for the terminal. The Internet appliance according to this particular embodiment of the invention further includes a processor (such as a central processor unit or CPU) and an operating system for implementing the protocol-level programs and the antivirus programs, wherein the antivirus programs are advantageously transparent to the terminal.

47 Claims, 8 Drawing Sheets

ANTIVIRUS STAND-ALONE NETWORK OR INTERNET APPLIANCE AND METHODS THEREFOR

BACKGROUND OF THE INVENTION

1. Field of the Invention

This invention relates generally to computer or network antivirus applications and more specifically to an antivirus stand-alone network or Internet appliance and methods therefor.

2. Description of the Related Art

Antivirus application programs are commonly used in the art to protect computers or networks from computer virus infections. Conventional antivirus application programs are installed and stored within the computer or user terminal for antivirus protection against extraneous virus attempts to infect that computer or user terminal through network or Internet traffic. For new or emergent viruses not included in the application programs, additional installations of upgrade programs or patches for the new viruses are required at the user terminal, through a download installation via the Internet or physical installation at the user terminal.

There are nonetheless shortcomings in the antivirus application programs in the art in protecting the user terminal against computer viruses. Storing antivirus application programs at the user terminal inordinately occupies hardware and software resources therein. Additional installations of upgrade programs or patches at the user terminal are time- and resource-consuming, which routinely interrupt normal operations of the user terminal. Moreover, computer viruses may have physically entered the user terminal through automatic plug-ins or upgrade patches before being detected by the antivirus application programs.

There is therefore a general need in the art for an optimal antivirus device and methods therefor overcoming at least the aforementioned shortcomings in the art. In particular, there is a need in the art for an optimal antivirus device and methods therefor advantageously reducing the utilization of hardware and software resources of the user terminal when operating the antivirus application programs.

SUMMARY OF THE INVENTION

The invention provides an antivirus network or Internet appliance and methods therefore. A preferred embodiment of the Internet appliance according to the invention comprises an interface connecting the Internet appliance to a terminal, a memory, and a network connection connecting the Internet appliance to a network (such as a wide area network (WAN) or the Internet) wherein data in the network are operable with a corresponding network protocol (such as TCP/IP). Protocol-level programs are stored in the memory for receiving data being transmitted from the network to the terminal through the Internet appliance wherein the protocol-level programs are compatibly operable with the network protocol. Application-level antivirus programs stored in the memory for detecting computer viruses in the received data serving as a firewall against the detected computer viruses for the terminal. The Internet appliance according to this particular embodiment of the invention further includes a processor (such as a central processor unit or CPU) and an operating system for implementing the protocol-level programs and the antivirus programs, wherein the antivirus programs are advantageously transparent to the terminal.

The device and method according to the invention advantageously overcome at least the aforementioned shortcomings in the art. In particular, having a standalone antivirus device no longer requires the inordinate consumption of hardware and software resources at the user terminal. Since the antivirus programs are advantageously transparent to the user terminal, installations of upgrade programs or patches no longer interrupt the normal operations of the user terminal. Moreover, having a standalone antivirus device disposed transparently to the user terminal advantageously serves as an effective first-line defense against computer viruses prior to the possibility of their physical entry into the user terminal through automatic plug-ins or upgrade patches.

BRIEF DESCRIPTION OF THE DRAWINGS

The preferred and other embodiments according to the invention are further described in detail below in conjunction with the accompanying drawings (not necessarily drawn to scale), in which.

DETAILED DESCRIPTION OF THE PREFERRED EMBODIMENTS

Figure 1:
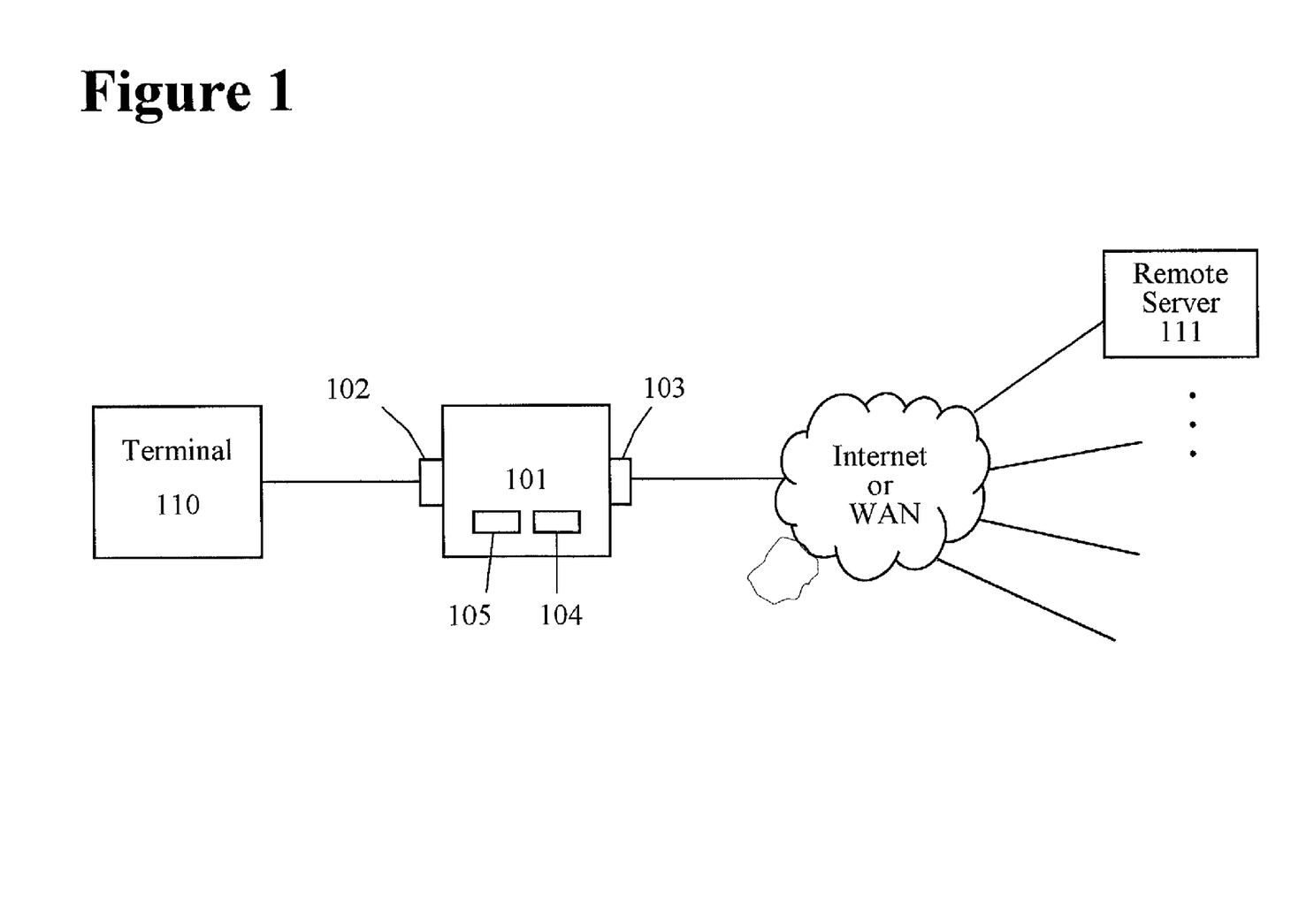
FIG. 1 is a block diagram generally illustrating an antivirus network or Internet appliance in accordance with the invention.

FIG. 1 is a block diagram that generally illustrates an antivirus network or Internet appliance 101 in accordance with the invention. According to a preferred embodiment of the invention, the Internet appliance 101 comprises an interface 102 connecting the Internet appliance 101 to a terminal 110, a memory 104, a network connection 103 connecting the Internet appliance 101 to a network (such as a wide area network (WAN) or the Internet) wherein data in the network are operable with a corresponding network protocol (such as TCP/IP). The terminal 101 can be a microcomputer, a workstation, a personal computer (PC), a notebook computer, a laptop computer, a palmtop computer, a wireless computer or a personal digital assistant. The interface 102 connecting the Internet appliance 101 to the terminal 110 can be an Ethernet interface or a local area network (LAN) interface, where the interface 102 can be hardwired or wireless. The network connection 103 can be a modem, a cable modem, a T1 line, a digital subscriber line (DSL) or an advanced digital subscriber line (ADSL). The memory 104 can be a nonvolatile memory, read only memory (RAM), static read only memory (SRAM) or dynamic read only memory (DRAM). Protocol-level programs are stored in the memory 104 for receiving data being transmitted from the network to the terminal 110 through the Internet appliance 101 wherein the protocol-level programs are compatibly operable with the network protocol, such as Transmission Control Protocol/Internet Protocol (TCP/IP). TCP/IP is a standard protocol developed to provide transmission and addressing for network connections (e.g., the Internet). Application-level antivirus programs are stored in the memory 104 for detecting computer viruses in the received data serving as a firewall against the detected computer viruses for the terminal 110. The Internet appliance 101 further comprises a processor 105 (such as a central processor unit or CPU) and an operating system for implementing the protocol-level programs and the antivirus programs, wherein the antivirus programs are advantageously transparent to the terminal 110.

Figure 2:
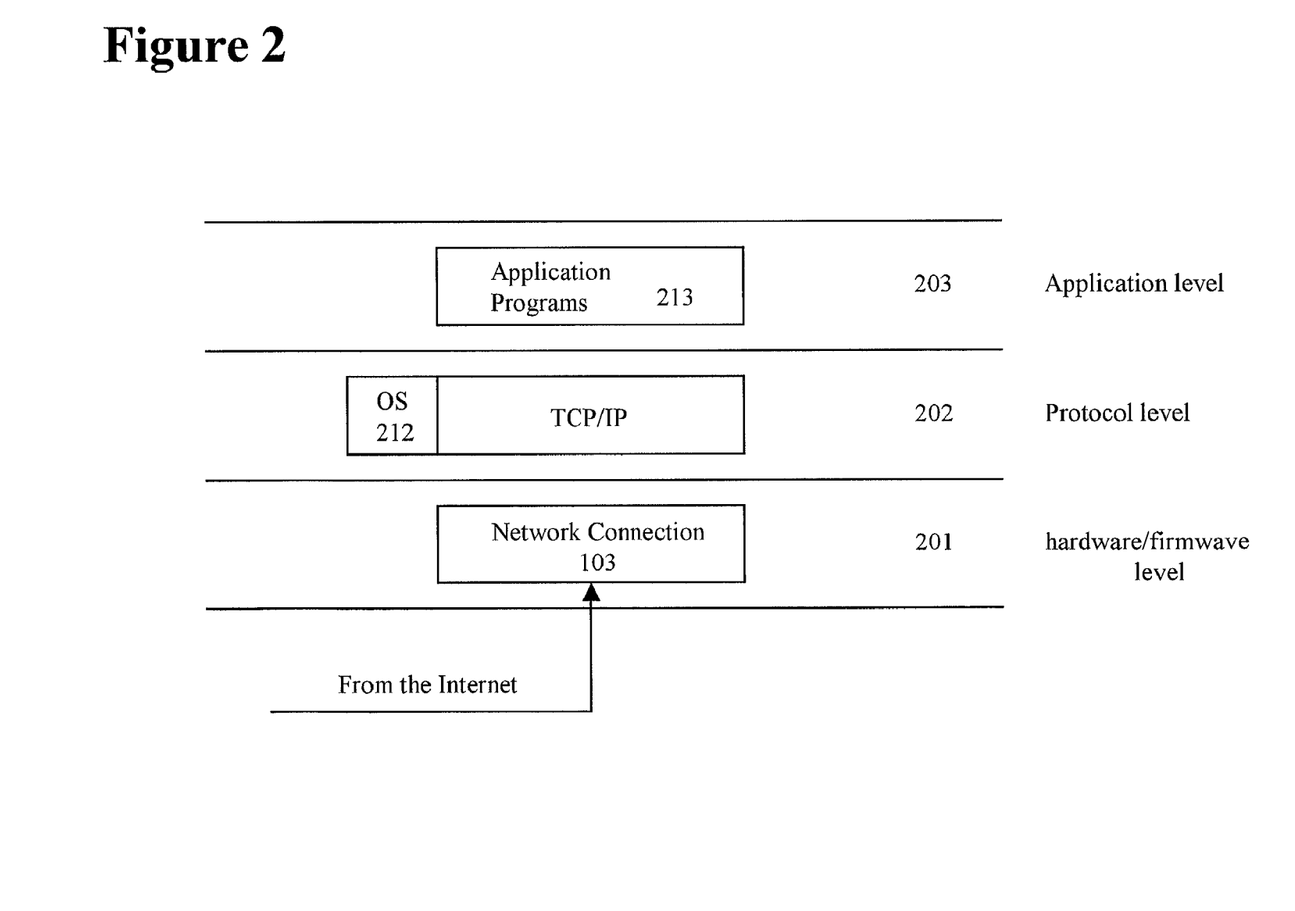
FIG. 2 is a diagram schematically illustrating the layers in which a preferred embodiment of the antivirus network or Internet appliance according to the invention is operable.

FIG. 2 is a diagram that schematically illustrates the simplified layer architecture in which a preferred embodiment of the antivirus network or Internet appliance 101 according to the invention is operable. The Internet appliance 101 includes three layers, namely, the hardware/firmware layer 201, the protocol layer 202 and the application layer 203. Hardware or firmware resources (e.g., the network connection 103) of the Internet appliance 101 are located at the layer 201. The operating system 212 with protocol-level programs are stored in the protocol layer 202 for receiving data being transmitted from the network to the terminal 110 through the Internet appliance 101 wherein the protocol-level programs are compatibly operable with the network protocol such as TCP/IP. Application programs 213 are stored at the application level 203, including antivirus programs for detecting computer viruses serving as a firewall against the detected computer viruses for the terminal 110. The processor 105, in conjunction with the operating system 212, implements the protocol-level programs in the protocol layer 202 and the antivirus programs in the application layer 203. According to further embodiments of the invention, the Internet appliance 101 further includes an upgrade program in the application layer 203 for upgrading a program in the Internet appliance 101. The Internet appliance 101 can also include a browser program in the application layer 203 for displaying information retrieved from the WAN or the Internet at the terminal 110. The browser program can display a message with a plurality of upgrade options for user selection at the terminal 110. The message displayed by the browser program can further include a product registration request, virus alert, hacker scheme alert, additional feature announcement, antivirus program upgrade, operating system upgrade, emergency antivirus program upgrade or browser program upgrade announcements.

The upgrade program in the application layer 203 performs an upgrade download from the remote server 111 connected to the WAN or the Internet for upgrading the antivirus programs in the Internet appliance 101. The upgrade program, along with the upgrade download, is advantageously transparent to the terminal 110. The upgrade download can be automatic, user-initiated at the terminal 110, or server-initiated at the remote server 111. As the terminal 110 accesses the Internet through the Internet appliance 101, the upgrade program connects to the remote server 111. The upgrade program performs the upgrade download from the remote server 111, e.g., if the remote server 111 instructs the upgrade download.

In addition, the remote server 111 can include a plurality of upgrade downloads. As the terminal 110 accesses the Internet through the Internet appliance 101, the upgrade program connects to the remote server 111. The upgrade program then compares the antivirus programs in the application layer 203 with the plurality of upgrade downloads at the remote server 111 to determine which of the upgrade downloads is required. The upgrade downloads from the remote server 111 are selectively performed for the antivirus programs in the application layer 203 with the required upgrade downloads as determined by the upgrade program.

The upgrade downloads can further include other downloads. According to further embodiments of the invention, the upgrade downloads can include operating system upgrade downloads, emergency antivirus program upgrade or patch downloads, or browser program upgrade downloads.

In yet additional embodiments according to the invention, the protocol-level programs, antivirus programs, and upgrade programs are stored as firmware at the hardware/firmware layer 201.

Figure 3:
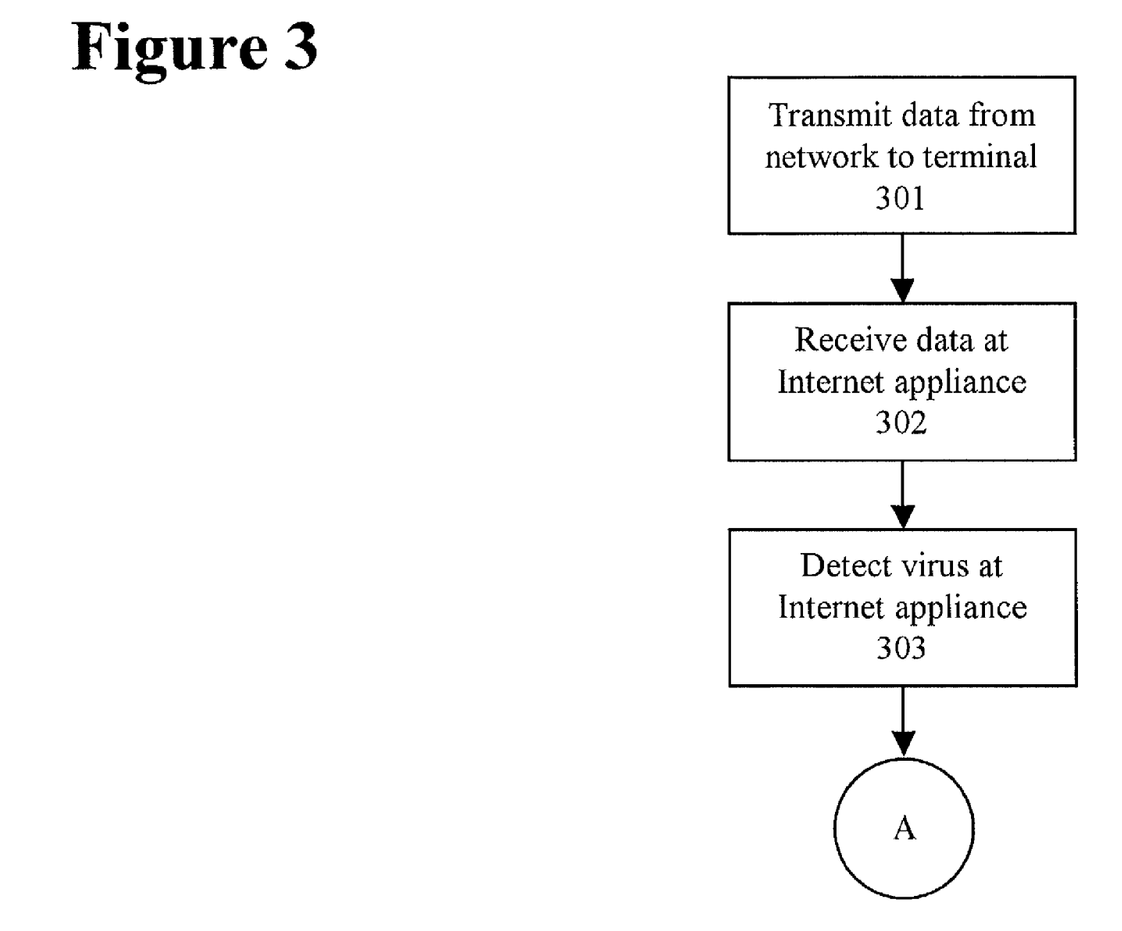
FIGS. 3 and 4 are flow diagrams generally illustrating a preferred embodiment of the antivirus method using the Internet appliance according to the invention.
Figure 4:
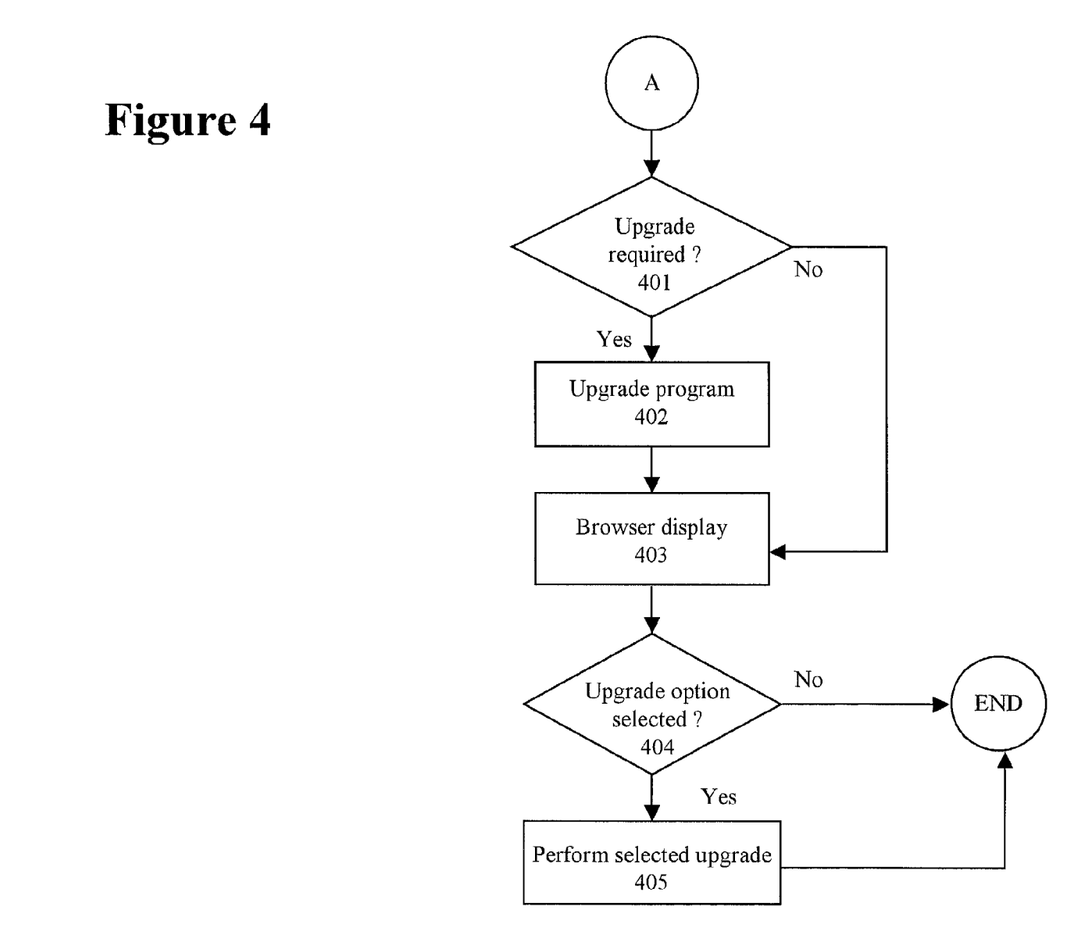

FIGS. 3 and 4 are flow diagrams that generally illustrate a preferred embodiment of the antivirus method using the Internet appliance according to the invention. In step 301, data are transmitted from the WAN or Internet to the terminal 110 through the Internet appliance 101. The transmitted data are operable with a corresponding network protocol such as TCP/IP. In step 302, the transmitted data are received using protocol-level programs stored in the memory 104 of the Internet appliance 101, where the protocol-level programs are compatibly operable with the network protocol, i.e., TCP/IP. In step 303, application-level antivirus programs stored in the memory 103 detect computer viruses in the received data where the antivirus programs serve as a firewall against the detected computer viruses for the terminal 110. The detecting step 303 is advantageously transparent to the terminal 110. The control flow is then directed to A, which in turn is directed to step 401.

In step 401, it is determined whether an upgrade is required. If it is determined that an upgrade is required for a particular program or programs in the Internet appliance 101 per step 401, that program is upgraded using an application-level upgrade program in the memory 103. The upgrading step is advantageously transparent to the terminal 110. The control flow is then directed to step 403 where an application-level browser program in the memory 103 displays information retrieved from the WAN or Internet at the terminal 110 (step 403).

If it is determined that an upgrade is not required per step 401, a browser program in the memory 103 of the Internet appliance 101 displays information retrieved from the WAN or Internet at the terminal 110 (step 403), e.g., a list of upgrade options. In step 404, it is determined which of the upgrade options is selected. If an upgrade option (or options) is selected, that selected upgrade is performed by downloading it to the Internet appliance 101 in step 405 and then the present antivirus operation of the Internet appliance is concluded until the next time the terminal 110 accesses the WAN or the Internet through the Internet appliance 101. If no upgrade option is selected in step 404, the present antivirus operation of the Internet appliance 101 is concluded until the next time the terminal 110 accesses the WAN or Internet.

According to additional embodiments of the method of the invention, a plurality of criteria can be used in determining whether an upgrade is required in step 401. The remote server 111 can directly instruct the upgrade program in the Internet appliance 101 to execute an upgrade, particularly for comprehensive antivirus program updates or patch downloads. In addition, the antivirus programs in the Internet appliance 101 can also be compared with the upgrade downloads stored in the remote server 111 to determine which of the upgrade downloads is required. The corresponding upgrade download is accordingly performed. The upgrade can include, in addition to antivirus program upgrades, operating system upgrades, emergency antivirus upgrades, or browser program upgrades.

According to another embodiment of the method of the invention, the browser program in the Internet appliance 101 can further display a message having a plurality of upgrade options for viewing at the terminal 110. As the terminal 110 accesses the WAN or the Internet through the Internet appliance 101, the browser program displays a pop-up message or window showing the upgrade options available for viewing at the terminal 110. The message displayed by the browser program can include, in addition to antivirus program upgrades, a product registration request, virus alert, hacker scheme alert, additional feature announcement, operating system upgrade, emergency antivirus upgrade or browser program upgrade. Similarly, the upgrade options can include, in addition to antivirus program upgrades, operating system upgrades, emergency antivirus upgrades, or browser program upgrades.

Figure 5:
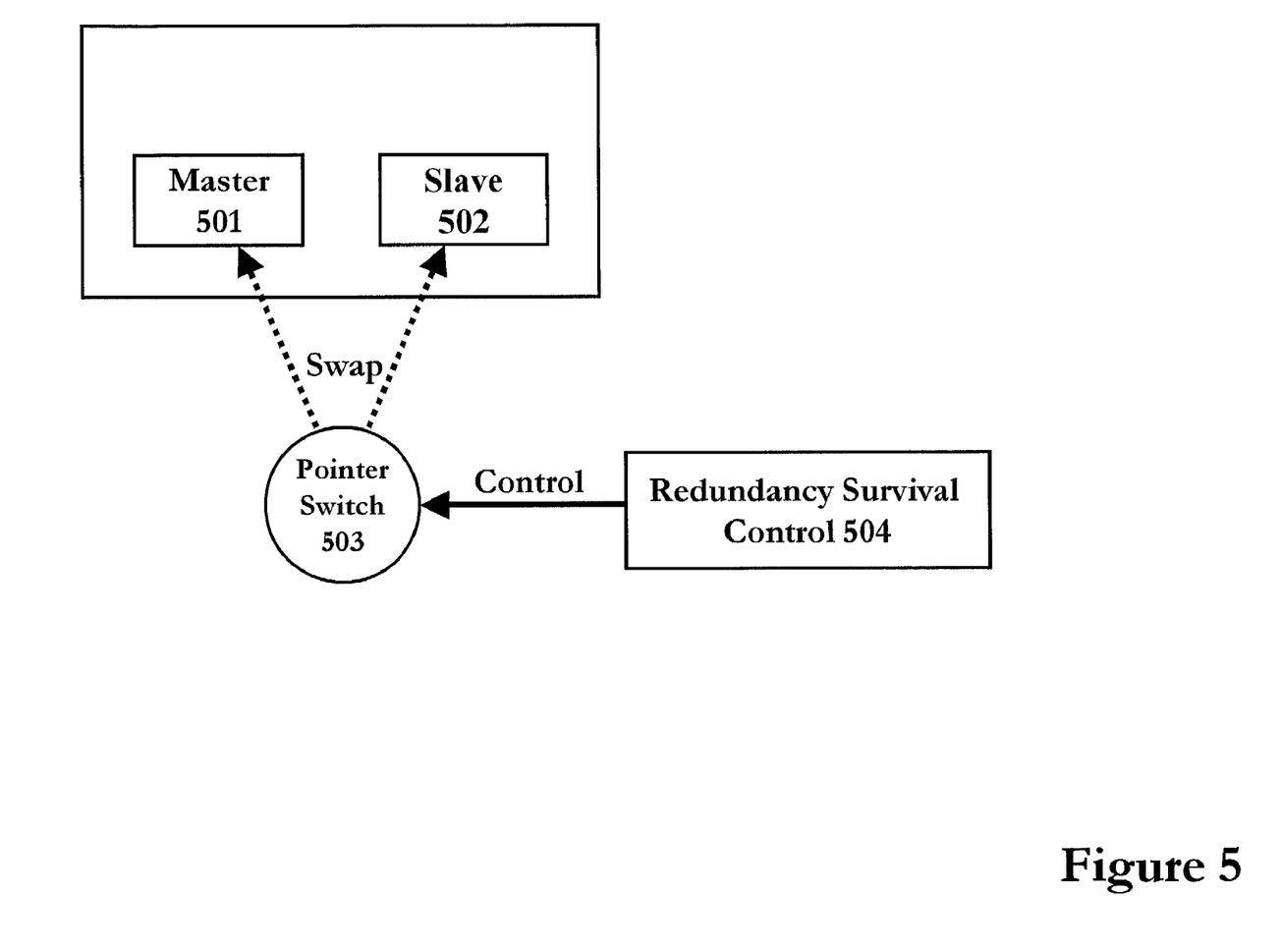
FIG. 5 is a block diagram schematically illustrating a pair of master and slave programs in the operating system of the Internet appliance for ensuring upgrade functionality in accordance with an additional embodiment of the invention.

FIG. 5 is a block diagram that schematically illustrates a pair of master and slave programs in the operating system of the Internet appliance 101 for ensuring upgrade functionality in accordance with an additional embodiment of the invention. According to this particular embodiment of the invention, an application-level upgrade program is stored in the memory 103 for upgrading a program in the Internet appliance 101 where the upgrading is advantageously transparent to the terminal 110. The operating system 212 in the protocol level 202 in the Internet appliance 101 further comprises a master program 501 storing the upgraded program, and a slave program 502 storing the program prior to the upgrading. The upgraded program stored in the master program 501 is implemented provided that the upgrade program completes the upgrading. Otherwise, the program stored in the slave application program 502 is implemented if the upgrade program fails to complete the upgrading. The control and the associated logic are stored in the redundancy control 504 controlling a pointer switch 503 (i.e., whether the upgrade program completes the upgrading) for accordingly switching between the master program 501 and the slave program 502. The pointer switch 503 switches between the master program 501 and the slave program 502 according to whether the upgrade program completes the upgrading.

A method corresponding to the pair of master and slave programs 501 and 502 for ensuring upgrade functionality in accordance with an additional embodiment of the invention therefore comprises the steps of upgrading a program in the Internet appliance 101 using the upgrade program therein, providing a master program 501 for storing the upgraded program, providing a slave program 502 for storing the program prior to the upgrading step, implementing the upgraded program stored in the master program 501 if the upgrading step is completed, and implementing the program stored in the slave program 502 if the upgrading step is incomplete or unsuccessful.

Figure 6:
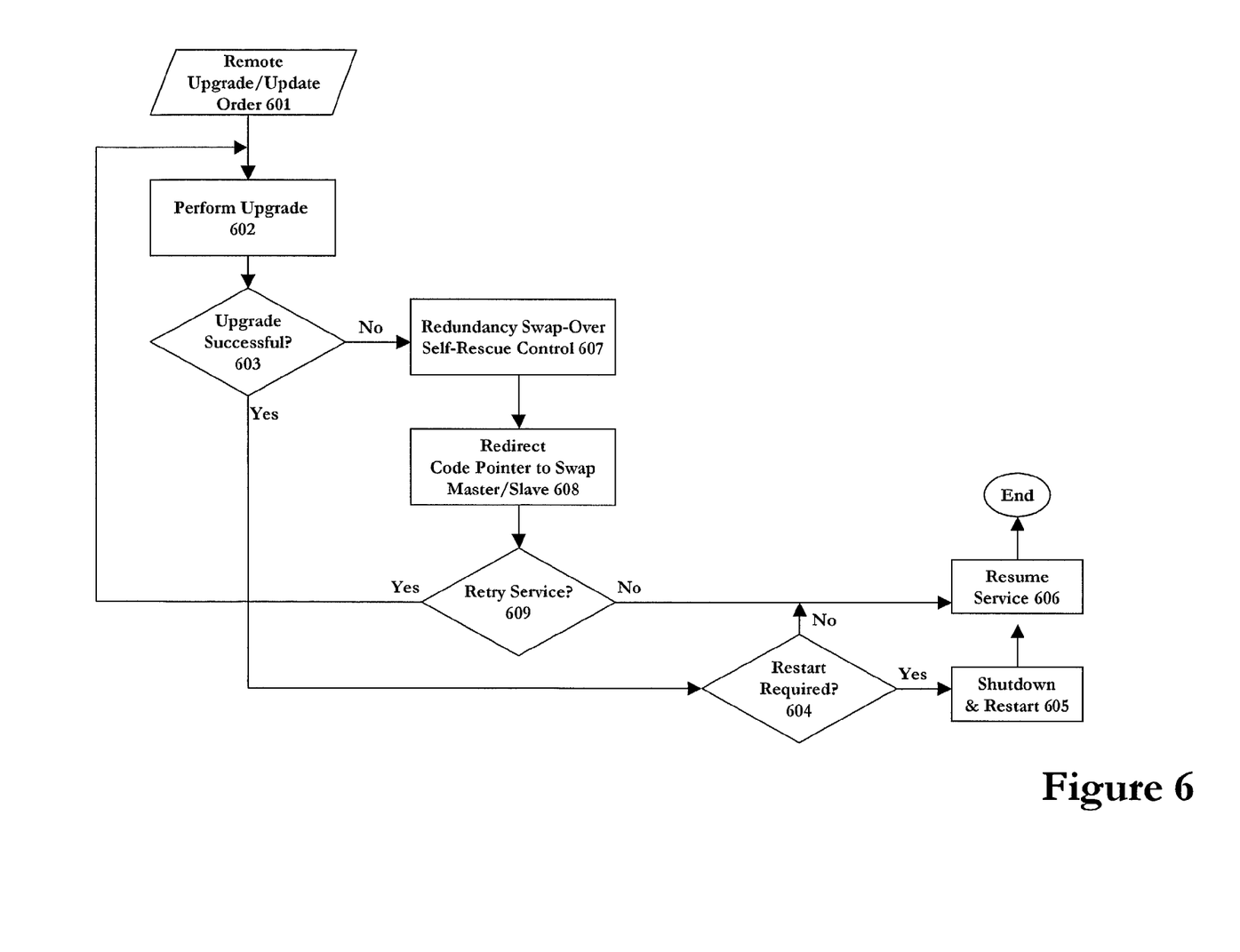
FIG. 6 is a flow diagram schematically illustrating a method for a pair of master and slave programs in the operating system of the Internet appliance 101 for ensuring upgrade functionality according to the invention.

FIG. 6 is a flow diagram that schematically illustrates a method for a pair of master and slave programs in the operating system of the Internet appliance 101 for ensuring upgrade functionality according to the invention. In step 601, the upgrade is ordered for a particular program in the Internet appliance 101. The upgrade program then performs the upgrade for the program in step 602 where the upgrade is transparent to the terminal 110. In step 603, it is determined whether the upgrade is complete or successful. If it is determined that the upgrade is complete, the control flow is then directed to step 604. It is determined whether a restart for the Internet appliance 101 is required in step 604. If a restart is required, the control flow is directed to step 605 where the Internet appliance 101 is shut down and restarted. In step 606, service of the Internet appliance 101 is restored after the restart. If a restart is not required per step 604, the control flow is directed to step 606. In step 606, service of the Internet appliance 101 is resumed.

If it is determined in step 603 that the upgrade is incomplete or unsuccessful, the control flow is directed to step 607 where the redundancy control 504 is implemented. The pointer switch 503 is accordingly instructed to point to the slave program 502 if the upgrade is incomplete. The upgraded program stored in the master program 501 is implemented provided that the upgrade program completes the upgrading. Otherwise, the program stored in the slave application program 502 is implemented if the upgrade program fails to complete the upgrading. The pointer switch 503 switches between the master program 501 and the slave program 502 according to whether the upgrade program completes the upgrading.

If it is determined that service should be retried for the Internet appliance 101 in step 609, the control flow is returned to step 602 for performing the upgrade once more. If it is determined that service for the Internet appliance 101 should not be re-attempted, the control flow is then directed to step 606 where service is resumed for the Internet appliance 101.

According to yet another embodiment of the invention, the Internet appliance 101 can further include a plurality of operational modes such as a continuous service mode, an idle mode, a maintenance mode, and a service-maintenance mode. As the terminal 110 accesses the WAN or the Internet through the Internet appliance 101, the antivirus programs continuously detect the received data in the continuous service mode, whereas the upgrade program idles in the idle mode. As the terminal 110 accesses the WAN or the Internet through the Internet appliance 101, the upgrade program performs the upgrading in the maintenance mode. In the service-maintenance mode, the antivirus programs continuously detect the received data and the upgrade program performs the upgrading in a generally simultaneous manner. The operational order and transitioning for the operational modes are interchangeable. The operational modes are freely transitionable from one mode to the next.

Figure 7:
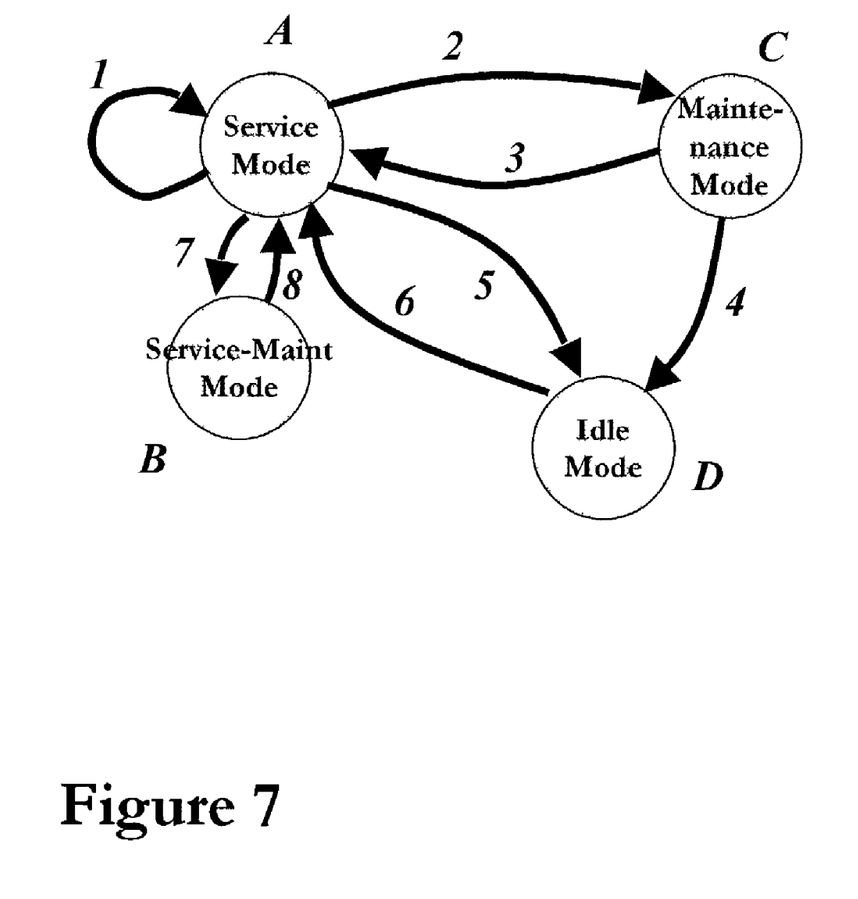
FIG. 7 is a diagram schematically illustrating exemplary operational transitions of the operational modes in the Internet appliance in accordance with yet another preferred embodiment of the invention.

FIG. 7 is a diagram that schematically illustrates exemplary operational transitions of the operational modes A, B, C and D in the Internet appliance 101 in accordance with yet another preferred embodiment of the invention. In the continuous service mode A in transition 1, the Internet appliance 101 provides sustained and continuous service operation. In transition 2, the operational mode for the Internet appliance 101 switches from the continuous service mode A to the maintenance mode C where service is terminated for maintenance. In transition 3, the operational mode for the Internet appliance 101 switches from the maintenance mode C back to the continuous service mode A as maintenance is concluded and service is resumed. In transition 4, the operational mode for the Internet appliance 101 switches from the maintenance mode C to the idle mode D as maintenance is concluded and service idles. In transition 5, the operational mode for the Internet appliance 101 switches from the continuous service mode A to the idle mode D as no service is required and service accordingly idles. In transition 6, the operational mode for the Internet appliance 101 switches from the idle mode D to the continuous service mode A as idling ceases and service resumes. In transition 7, the operational mode for the Internet appliance 101 switches from the continuous service mode A to the service-maintenance mode B as service continues along with background maintenance. In transition 8, the operational mode for the Internet appliance 101 switches from the service-maintenance mode B back to the continuous service mode A as background maintenance concludes and service resumes.

Figure 8:
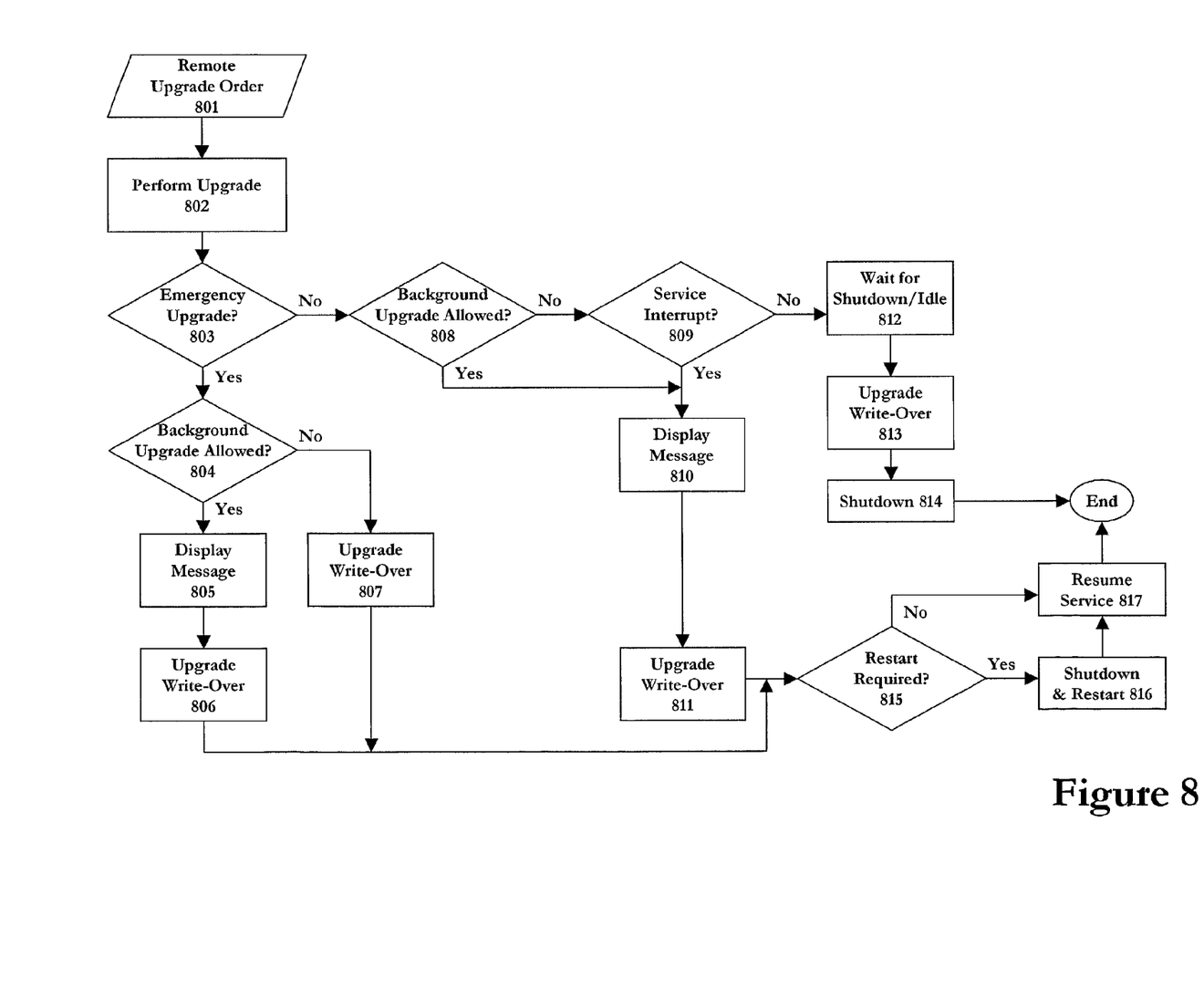
FIG. 8 is a flow diagram schematically illustrating an exemplary transition operation of the Internet appliance 101 in accordance with a further embodiment of the invention.

FIG. 8 is a flow diagram that schematically illustrates an exemplary transition operation of the Internet appliance 101 in accordance with a further embodiment of the invention. As an upgrade is ordered for the Internet appliance 101 in step 801, the upgrade is accordingly performed in step 802. It is then determined whether an emergency upgrade is required in step 803. If an emergency upgrade is required per step 803, the control flow is directed to step 804 where it is further determined whether a background upgrade in the service-maintenance mode B is allowed. If the background upgrade is allowed per step 804, a service message is displayed at the terminal 110 in step 805 and the upgrade write-over in the application layer (or the firmware layer) is accordingly performed in the service-maintenance mode B in step 806. If the background upgrade is not allowed per step 804, the Internet appliance 101 switches to the idle mode D where the upgrade write-over is accordingly performed.

If it is determined that an emergency upgrade is not required per step 803, the control flow is directed to step 808 where it is further determined whether a background upgrade in the service-maintenance mode B is allowed. If the background upgrade is allowed per step 808, a service message is displayed at the terminal 110 in step 810 and the upgrade write-over in the application layer (or the firmware layer) is accordingly performed in the service-maintenance mode B in step 811 where the control flow is further directed to step 815. If the background upgrade is not allowed per step 808, the control flow is then directed to step 809 where it is further determined whether a service interrupt is allowed.

If the service interrupt is allowed per step 809, a service message is displayed at the terminal 110 in step 810 and the upgrade write-over in the application layer (or the firmware layer) is accordingly performed in step 811 where the control flow is further directed to step 815.

If the service interrupt is not allowed per step 809, the control flow is directed to step 812 where the Internet appliance 101 waits for shutdown to the idle mode D. The upgrade write-over is accordingly performed in the idle mode D in step 813, where the control flow is further directed to step 814 for service shutdown.

In step 815, it is determined whether a restart of the Internet appliance 101 is required. If a restart is required per step 815, the Internet appliance 101 is shut down and restarted in step 816. In step 817, service is resumed for the Internet appliance. If a restart is not required per step 815, the control flow is directed to step 817 where service is resumed for the Internet appliance.

While the above is a full description of the specific embodiments, various modifications, alternative constructions and equivalents may be used. The above description and illustrations should not be taken as limiting the scope of the present invention which is defined by the following claims and their equivalents.

We claim:

1. An antivirus Internet appliance comprising:
    an interface connecting said Internet appliance to a terminal;
    a network connection connecting said Internet appliance to a network selected from the group consisting of a wide area network (WAN) and the Internet wherein data in said network are operable with a corresponding network protocol;
    a memory;
    protocol-level programs stored in said memory for receiving data being transmitted from said network to said terminal through said Internet appliance wherein said protocol-level programs are compatibly operable with said network protocol;
    application-level antivirus programs stored in said memory for detecting computer viruses in said received data wherein said antivirus programs serve as a firewall against said detected computer viruses for said terminal;
    a processor and an operating system stored in said memory for implementing said protocol-level programs and said antivirus programs
    a redundancy control software component stored in said memory that controls a pointer switch for switching between an upgraded anti-virus program and a non-upgraded anti-virus program;
    wherein said antivirus programs are transparent to said terminal; and
    wherein said anti-virus Internet appliance has four operational modes that include a continuous-service mode, a maintenance mode in which service is terminated, an idle mode, and a service-maintenance mode in which an antivirus service continues with maintenance on the antivirus Internet appliance being performed in the background, and wherein transitions between modes include: 1) continuous-service mode to maintenance mode, 2) maintenance mode to continuous-service mode, 3) maintenance mode to idle mode, 4) continuous-service mode to idle mode, 5) idle mode to continuous-service mode, 6) continuous-service mode to service-maintenance mode, 7) and service-maintenance mode to continuous-service mode.

2. The Internet appliance of claim 1 wherein said terminal is one selected from the group consisting of a microcomputer, a workstation, a personal computer (PC), a notebook computer, a laptop computer, a palmtop computer, a wireless computer, and a personal digital assistant (PDA).

3. The Internet appliance of claim 1 further comprising an application-level upgrade program stored in said memory for upgrading a program in said Internet appliance wherein said upgrade program is transparent to said terminal.

4. The Internet appliance of claim 3 wherein said network is connected to a remote server;
    wherein said upgrade program performs an upgrade download from said remote server; and
    wherein said upgrade download is transparent to said terminal.

5. The Internet appliance of claim 4 wherein said upgrade download is one selected from the group consisting of an antivirus program upgrade, an operating system upgrade, an emergency antivirus program upgrade, and a browser program upgrade.

6. The Internet appliance of claim 3 wherein said network is connected to a remote server;
    wherein said upgrade program connects to said remote server as said terminal accesses said network through said Internet appliance;
    wherein said upgrade program performs an upgrade download from said remote server if said remote server instructs said upgrade download; and
    wherein said upgrade program upgrades said antivirus programs after said upgrade download is performed.

7. The Internet appliance of claim 3 wherein said network is connected to a remote server storing a plurality of upgrade downloads;

wherein said upgrade program connects to said remote server as said terminal accesses said network through said Internet appliance;

wherein said upgrade program compares said antivirus programs with said upgrade downloads to determine which of said upgrade downloads is required; and wherein said upgrade program upgrades said antivirus programs with said required upgrade download.

8. The Internet appliance of claim 3 wherein said upgrading is one selected from the group consisting of an antivirus program upgrade, an operating system upgrade, an emergency antivirus program upgrade, and a browser program upgrade.

9. The Internet appliance of claim 3 wherein said upgrade program is stored at a firmware level in said Internet appliance.

10. The Internet appliance of claim 3 wherein said network is connected to a server storing a plurality of upgrade downloads;

wherein said terminal further comprises a plurality of application programs stored therein;

wherein said upgrade program connects to said server as said terminal accesses said network through said Internet appliance;

wherein said upgrade program compares said application programs stored in said terminal with said upgrade downloads to determine which of said upgrade download is required; and wherein said upgrade program upgrades said application programs stores in said terminal with said required upgrade download.

11. The Internet appliance of claim 10 wherein said required upgrade download is one selected from the group consisting of a utility program upgrade, an operating system upgrade, an electronic mail program upgrade, and a browser program upgrade.

12. The Internet appliance of claim 3 further comprising an idle mode when said terminal accesses said network through said Internet appliance wherein said upgrade program idles in said idle mode.

13. The Internet appliance of claim 3 further comprising a maintenance mode when said terminal accesses said network through said Internet appliance wherein said upgrade program performs said upgrading in said maintenance mode.

14. The Internet appliance of claim 3 further comprising a service-maintenance mode when said terminal accesses said network through said Internet appliance wherein said antivirus programs continuously detect said received data and said upgrade program performs said upgrading in a generally simultaneous manner in said service-maintenance mode.

15. The Internet appliance of claim 3 further comprising:
a continuous service mode when said terminal accesses said network through said Internet appliance wherein said antivirus programs continuously detect said received data in said continuous service mode;
an idle mode when said terminal accesses said network through said Internet appliance wherein said upgrade program idles in said idle mode;
a maintenance mode when said terminal accesses said network through said Internet appliance wherein said upgrade program performs said upgrading in said maintenance mode; and
a service-maintenance mode when said terminal accesses said network through said Internet appliance wherein said antivirus programs continuously detect said received data and said upgrade program performs said upgrading in a generally simultaneous manner in said service-maintenance mode;
wherein said continuous service mode, said idle mode, said maintenance mode and said service-maintenance mode are freely transitionable from one mode to another.

16. The Internet appliance of claim 1 further comprising an application-level browser program stored in said memory for displaying information retrieved from said network at said terminal.

17. The Internet appliance of claim 16 wherein said network is connected to a remote server;
wherein said browser program connects to said remote server as said terminal accesses said network through said Internet appliance;
wherein said browser program displays a message having upgrade options at said terminal if said remote server instructs said message.

18. The Internet appliance of claim 17 wherein said message is one selected from the group consisting of a product registration request, virus alert, hacker scheme alert, additional feature announcement, antivirus program upgrade, an operating system upgrade, an emergency antivirus program upgrade, and a browser program upgrade.

19. The Internet appliance of claim 18 further comprising an application-level upgrade program stored in said memory for performing said upgrade options for said antivirus programs.

20. The Internet appliance of claim 17 wherein said upgrade options are selected from the group consisting of antivirus program upgrade, an operating system upgrade, an emergency antivirus program upgrade, and a browser program upgrade.

21. The Internet appliance of claim 1 wherein said protocol-level programs and said antivirus program are stored at a firmware level in said Internet appliance.

22. The Internet appliance of claim 1 further comprising a continuous service mode when said terminal accesses said network through said Internet appliance wherein said antivirus programs continuously detect said received data in said continuous service mode.

23. The Internet appliance of claim 1 wherein said interface is one selected from the group consisting of an Ethernet interface a local area network (LAND) interface, and said network connection is one selected from the group consisting of a modem, a cable modem, a T1 line, a digital subscriber line (DSL) and an advanced digital subscriber line (ADSL).

24. An antivirus method for a terminal connected to a network using an Internet appliance disposed therebetween, comprising the steps of:
transmitting data from said network to said terminal through said Internet appliance;
receiving said transmitted data using protocol-level programs stored in a memory of said Internet appliance;
detecting computer viruses in said received data using application-level antivirus programs stored in said memory of said Internet appliance wherein said antivirus programs serve as a firewall against said detected computer viruses for said terminal, wherein said detecting stop is transparent to said terminal;
determining whether an upgrade to an anti-virus program was successful and using the upgraded anti-virus program if the upgrade was successful and using a non-upgraded anti-virus program if not successful; and
transitioning among four operational modes including a continuous-service mode, a maintenance mode in which service is terminated, an idle mode, and a service-maintenance mode in which an antivirus service continues with maintenance on the Internet appliance being performed in the background; wherein the transitions include: 1) continuous-service mode to maintenance mode, 2) maintenance mode to continuous-service mode, 3) maintenance mode to idle mode, 4) continuous-service mode to idle mode, 5) idle mode to continuous-service mode, 6) continuous-service mode to service-maintenance mode, 7) and service-maintenance mode to continuous-service mode.

25. The method of clam 24 wherein said network is one selected from the group consisting of a side area network (WAN) and the Internet;
   wherein said transmitted data are operable with a corresponding network protocol; and
   wherein said protocol-level programs are compatibly operable with said network protocol.

26. The method of claim 24 wherein said terminal is one selected from the group consisting of a microcomputer, a workstation, a personal computer (PC), a notebook computer, a laptop computer, a palmtop computer, a wireless computer, and a personal digital assistant (PDA).

27. The method of claim 24 further comprising the step of upgrading a program in said Internet appliance using an application-level upgrade program stored in said memory wherein said upgrading step is transparent to said terminal.

28. The method of claim 27 further comprising the steps of:
   connecting said network to a remote server;
   performing an upgrade download from said remote server using said upgrade program;
   wherein said upgrade download is transparent to said terminal.

29. The method of claim 28 wherein said upgrade download is one selected from the group consisting of an antivirus program upgrade, an operating system upgrade, an emergency antivirus program upgrade, and a browser program upgrade.

30. The method of claim 27 further comprising the steps of:
   connecting said network to a remote server;
   accessing said network through said Internet appliance from said terminal;
   connecting said upgrade program to said remote server;
   performing an upgrade download from said remote server using said upgrade program if said remote server instructs said upgrade download; and
   wherein said upgrade program upgrades said antivirus programs after said upgrade download is performed.

31. The method of claim 27 further comprising the steps of:
   connecting said network to a remote server storing a plurality of upgrade downloads;
   accessing said network through said Internet appliance from said terminal;
   connecting said upgrade program to said remote server;
   comparing said antivirus programs with said upgrade downloads stored at said remote server to determine which of said upgrade downloads is required; and
   upgrading said antivirus programs with said required upgrade download using said upgrade program.

32. The method of claim 27 wherein said upgrading is one selected from the group consisting of an antivirus program upgrade, an operating system upgrade, an emergency antivirus program upgrade, and a browser program upgrade.

33. The method of claim 27 further comprising the step of storing said upgrade program at a firmware level in said Internet appliance.

34. The method of claim 27 further comprising the steps of:
   providing a plurality of application programs in said terminal;
   connecting said network to a server storing a plurality of upgrade downloads;
   accessing said network through said Internet appliance from said terminal;
   connecting said upgrade program to said server as said terminal accesses said network;
   comparing said application programs in said terminal with said upgrade downloads stored in said server to determine which of said upgrade downloads is required; and
   upgrading said application programs in said terminal with said required upgrade download using said upgrade program.

35. The method of claim 34 wherein said required upgrade download is one selected from the group consisting of a utility program upgrade, an operating system upgrade, an electronic mail program upgrade, and a browser program upgrade.

36. The method of claim 27 further comprising the steps of:
   accessing said network through said Internet appliance from said terminal; and
   providing an idle mode when said terminal accesses said network;
   wherein said upgrade program idles in said idle mode.

37. The method of claim 27 further comprising the steps of:
   accessing said network through said Internet appliance from said terminal; and
   providing a maintenance mode when said terminal accesses said network;
   wherein said upgrade program performs said upgrading in said maintenance mode.

38. The method of claim 27 further comprising the steps of:
   accessing said network through said Internet appliance from said terminal; and
   providing a service-maintenance mode when said terminal accesses said network;
   wherein said antivirus programs continuously detect said received data and said upgrade program performs said upgrading in a generally simultaneous manner in said service-maintenance mode.

39. The method of claim 27 further comprising the steps of:
   accessing said network through said Internet appliance from said terminal;
   providing a continuous service mode when said terminal accesses said network through said Internet appliance wherein said antivirus programs continuously detect said received data in said continuous service mode;
   providing an idle mode when said terminal accesses said network through said Internet appliance wherein said upgrade program idles in said idle mode;
   providing a maintenance mode when said terminal accesses said network through said Internet appliance wherein said upgrade program performs said upgrading in said maintenance mode; and
   providing a service-maintenance mode when said terminal accesses said network through said Internet appliance wherein said antivirus programs continuously detect said received data and said upgrade program performs said upgrading in a generally simultaneous manner in said service-maintenance mode;
   wherein said continuous service mode, said idle mode, said maintenance mode and said service-maintenance mode are freely transitionable from one mode to another.

40. The method of claim 24 further comprising the step of displaying information retrieved from said network at said terminal using an application-level browser program stored in said memory of said Internet appliance.

41. The method of claim 40 further comprising the steps of:
connecting said network to a remote server;
accessing said network from said terminal through said Internet appliance;
connecting said browser program to said remote server as said terminal accesses said network; and
displaying a message having upgrade options at said terminal using said browser program.

42. The method of claim 41 wherein said message is one selected from the group consisting of a product registration request, virus alert, hacker scheme alert, additional feature announcement, antivirus program upgrade, an operating system upgrade, an emergency antivirus program upgrade, and a browser program upgrade.

43. The method of claim 42 further comprising the steps of:
providing an application-level upgrade program in said memory of said Internet appliance; and
performing said upgrade options for said antivirus programs using said upgrade program.

44. The method of claim 41 wherein said upgrade options are selected from the group consisting of antivirus program upgrade, an operating system upgrade, an emergency antivirus program upgrade, and a browser program upgrade.

45. The method of claim 24 further comprising the step of storing said protocol-level programs and said antivirus programs at a firmware level in said Internet appliance.

46. The method of claim 24 further comprising the steps of:
storing an application-level upgrade program in said memory of said Internet appliance;
upgrading a program in said Internet appliance using said upgrade program wherein said upgrading is transparent to said terminal;
providing a master program for storing said upgraded program;
providing a slave program for storing said program prior to said upgrading step;
implementing said upgraded program stored in said master program if said upgrading step is completed; and
implementing said program stored in said slave program if said upgrading step is not completed.

47. The method of claim 24 further comprising the steps of:
accessing said network through said Internet appliance from said terminal; and
providing a continuous service mode when said terminal accesses said network;
wherein said antivirus programs continuously detect said received data in said continuous service mode.

* * * * *